United States Patent
Tene et al.

(10) Patent No.: US 9,361,114 B1
(45) Date of Patent: Jun. 7, 2016

(54) INSTRUCTION BASED INTERRUPT MASKING FOR MANAGING INTERRUPTS IN A COMPUTER ENVIRONMENT

(75) Inventors: Gil Tene, Los Altos Hills, CA (US); Scott Sellers, Menlo Park, CA (US); Jack Choquette, Mountain View, CA (US); Michael A. Wolf, San Francisco, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 539 days.

(21) Appl. No.: 11/296,651

(22) Filed: Dec. 6, 2005

(51) Int. Cl.
*G06F 7/38* (2006.01)
*G06F 9/00* (2006.01)
*G06F 9/44* (2006.01)
*G06F 15/00* (2006.01)
*G06F 9/38* (2006.01)
*G06F 9/48* (2006.01)

(52) U.S. Cl.
CPC ............ *G06F 9/3861* (2013.01); *G06F 9/4812* (2013.01)

(58) Field of Classification Search
USPC ........................................................ 712/244
See application file for complete search history.

(56) References Cited

U.S. PATENT DOCUMENTS

| | | | | |
|---|---|---|---|---|
| 5,201,043 A * | 4/1993 | Crawford et al. | ................ | 714/49 |
| 5,361,375 A * | 11/1994 | Ogi | ................................... | 718/1 |
| 5,615,375 A * | 3/1997 | Ibusuki et al. | ................ | 710/264 |
| 5,729,729 A * | 3/1998 | Leung | ............................ | 712/244 |
| 5,875,342 A * | 2/1999 | Temple | ......................... | 710/260 |
| 6,006,030 A * | 12/1999 | Dockser | ........................ | 712/227 |
| 6,170,033 B1 * | 1/2001 | Bennett | ......................... | 710/260 |
| 6,173,248 B1 * | 1/2001 | Brauch | ............................ | 703/26 |
| 6,243,786 B1 * | 6/2001 | Huang et al. | .................. | 710/262 |
| 6,282,636 B1 * | 8/2001 | Yeh et al. | ........................ | 712/218 |
| 6,405,300 B1 * | 6/2002 | Tremblay et al. | ............... | 712/24 |
| 6,871,173 B1 * | 3/2005 | Brauch | ............................ | 703/26 |
| 2004/0015627 A1 * | 1/2004 | Desoli et al. | ................... | 710/260 |
| 2005/0086455 A1 * | 4/2005 | DeWitt et al. | ................. | 712/227 |

OTHER PUBLICATIONS

Shivers et al.; Atomic Heap Transactions and Fine-grain Interrupts; 1999; ACM Press; ICFP '99; pp. 48-59.*
Patterson et al.; Computer Organization and Design: The Hardware/Software Interface, Second Edition; 1998; Morgan Kaufmann Publishers, Inc.; pp. 410-416.*

* cited by examiner

*Primary Examiner* — Corey S Faherty
(74) *Attorney, Agent, or Firm* — Van Pelt, Yi & James LLP

(57) ABSTRACT

Managing interrupts in a computing environment includes executing an instruction, deriving an interrupt mask value based at least in part on the instruction being executed, performing a masking operation involving the interrupt mask value and at least one pending interrupt to determine whether a pending interrupt is allowable, and in the event that the pending interrupt is allowable, performing the interrupt.

16 Claims, 6 Drawing Sheets

| Interrupt<br>Mask | u | v | w | x | y | z |
|---|---|---|---|---|---|---|
| A | 0 | 1 | 1 | 0 | 0 | 1 |
| B | 1 | 0 | 0 | 0 | 1 | 0 |
| C | 1 | 0 | 1 | 0 | 0 | 0 |
| D | 0 | 1 | 0 | 1 | 0 | 0 |

302

| Instruction | Load | Add | And | Shift | Branch | ... |
|---|---|---|---|---|---|---|
| Mask | A | C | D | B | D | ... |

304

| Mask \ Interrupt | u | v | w | x | y | z |
|---|---|---|---|---|---|---|
| A | 0 | 1 | 1 | 0 | 0 | 1 |
| B | 1 | 0 | 0 | 0 | 1 | 0 |
| C | 1 | 0 | 1 | 0 | 0 | 0 |
| D | 0 | 1 | 0 | 1 | 0 | 0 |

302

| Instruction | Load | Add | And | Shift | Branch | ... |
|---|---|---|---|---|---|---|
| Mask | A | C | D | B | D | ... |

Global Mask:

|  | u | v | w | x | y | z |
|---|---|---|---|---|---|---|
|  | 1 | 0 | 0 | 1 | 0 | 1 |

| Instruction | Secondary Mask | | | | | |
|---|---|---|---|---|---|---|
| Load | 1 | 1 | 1 | 1 | 1 | 1 |
| Add | 1 | 1 | 0 | 1 | 1 | 1 |
| And | 1 | 1 | 1 | 0 | 1 | 1 |
| Branch | 0 | 0 | 0 | 0 | 0 | 0 |
| ... | ... | | | | | |

FIG. 5

INSTRUCTION BASED INTERRUPT MASKING FOR MANAGING INTERRUPTS IN A COMPUTER ENVIRONMENT

BACKGROUND OF THE INVENTION

In computer systems, an interrupt refers to a signal to a processor requesting the processor to switch its context. A valid interrupt stops the processor from carrying out its regular operations and redirect the processor control to a different location to handle the interrupt. Interrupts are useful for processing asynchronous events such as keyboard inputs and network inputs/outputs.

It is often useful for a system to selectively allow or disallow certain interrupts. Existing processors typically implement a global interrupt mask for determining which interrupts are allowable. Each bit in the global interrupt mask corresponds to a particular interrupt. A bit value of 0 typically means that the corresponding interrupt is enabled. If an instruction is executing while such an interrupt is pending, the instruction should context switch and handle the interrupt. A bit value of 1 usually means that the corresponding interrupt is not allowed and should be ignored if it is pending. All instructions handle interrupts in the same way according to the global interrupt mask.

While interrupt handling schemes using a global mask is useful in many systems, some issues remain. For example, efficiency problems associated with using global mask are common in virtual machine (VM) environments, where software running on an emulator system emulates the behavior of another platform. A single "virtual" instruction of the emulated platform is often emulated using several native instructions on the emulator system. To handle pending interrupts passed on by the emulator system to the emulated platform, some of the existing VM emulators poll for emulated interrupts at each native instruction. Polling is usually costly in terms of processor cycles and can lead to inefficiency. Thus, it would be desirable to have a more efficient way of handling interrupts, especially in virtual machine environments. It would also be useful to have greater flexibility in handling interrupts.

BRIEF DESCRIPTION OF THE DRAWINGS

Various embodiments of the invention are disclosed in the following detailed description and the accompanying drawings.

FIG. 3 is a block diagram illustrating an embodiment of data structures used for interrupt handling.

FIG. 5 is a block diagram illustrating another embodiment of data structures used for interrupt handling.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing interrupts in a computing environment is disclosed. In some embodiments, while an instruction is being executed, an interrupt mask value based at least in part on the instruction is derived. A masking operation involving the interrupt mask value and at least one indication of a pending interrupt is carried out to determine whether any pending interrupt is allowable. In the event that an interrupt is pending and the interrupt is allowable, an interrupt is performed. If, however, a pending interrupt is deemed not allowable, it is ignored, and remains pending. If no allowable interrupt is pending, the instruction performs its normal function. In some embodiments, the interrupt mask value is selected from a plurality of interrupt masks. In some embodiments, the interrupt mask value is derived by applying a secondary mask associated with the instruction to a global mask.

Figure 1A:
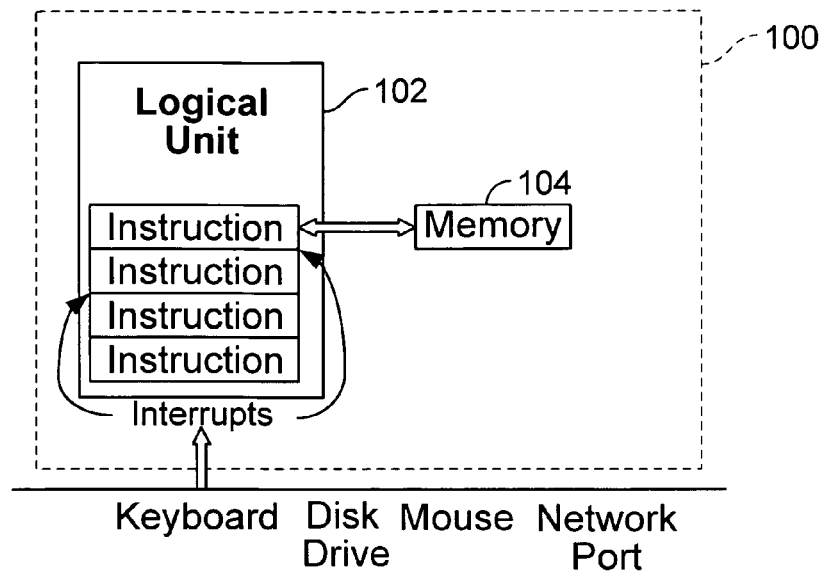
FIG. 1A is a block diagram illustrating an embodiment of a system configured to manage interrupts.

FIG. 1A is a block diagram illustrating an embodiment of a system configured to manage interrupts. Processor 100 includes a logical unit 102 and a memory 104. The memory provides the logical unit with instructions for execution. In some embodiments, the memory is a component separate from the processor and connected to the processor via a system bus. The logical unit executes instructions and receives interrupts from a number of sources. Examples of such sources include keyboard, mouse, monitor, disk drive, a network port, or another processor in the system. Other devices may also generate interrupt.

Figure 1B:
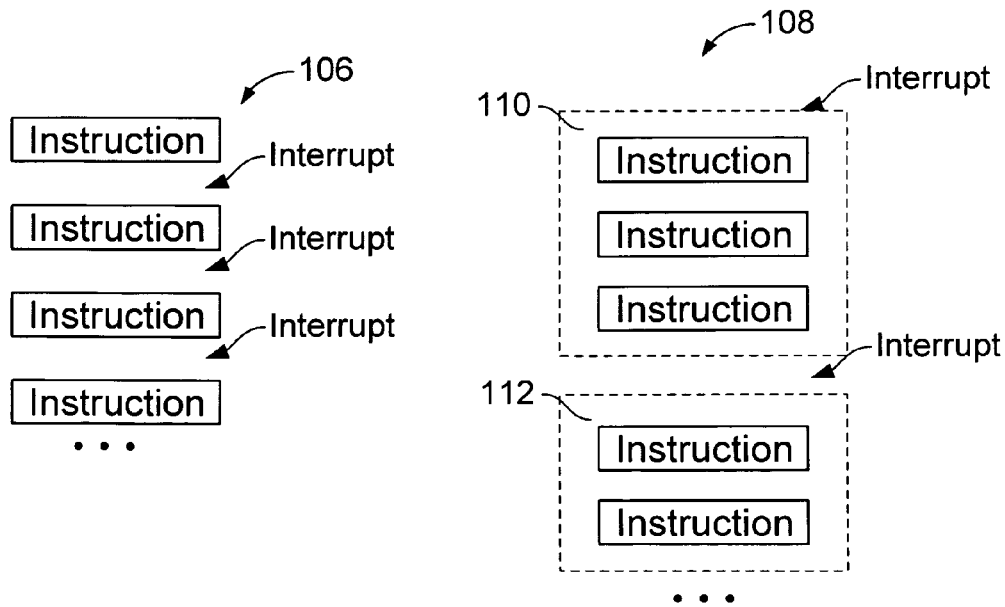
FIG. 1B is a diagram illustrating examples of instructions.

FIG. 1B is a diagram illustrating examples of instructions. The examples shown are instructions that can be executed by processor 100. 106 illustrates one type of instructions that allows interrupt to occur at the boundary of each instruction. In other words, the interrupts are allowed to proceed at the beginning or the end of each instruction. 108 illustrates another type of instructions that only allows interrupts to occur at certain places such as 110 and 112, where specific instructions begin. This type of instructions is used in some embodiments where the processor implements a virtual machine environment. In one example, instructions of programs are divided into subsections. Each subsection includes one or more native instructions that together correspond to a "virtual" instruction on the simulated platform. Interrupts are only allowed at the beginning or the end of a virtual instruction, where the states of the system are predictable. In another example, multiple virtual instructions are treated together in a "basic block" and translated to a set of native instructions. Interrupts are only allowed at the beginning or the end of the basic block. The places where interrupts are allowed to occur are referred to as safe points.

Figure 2:
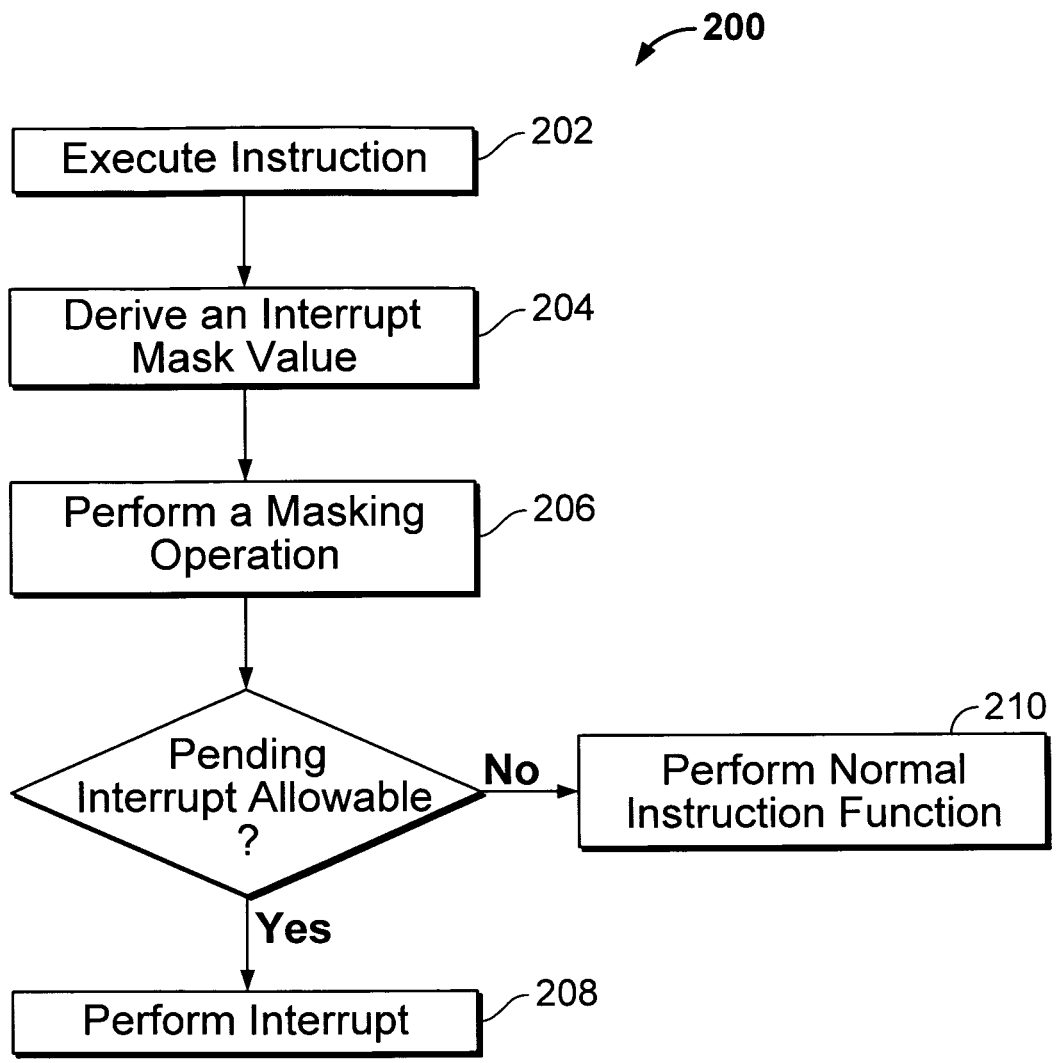
FIG. 2 is a flowchart illustrating an embodiment of a process of managing interrupts.

FIG. 2 is a flowchart illustrating an embodiment of a process of managing interrupts. Process 200 may be implemented on, for example, processor 100. In this example, the process starts when an instruction is being executed (202). An interrupt mask value is derived (204). As will be shown in more details below, the derivation is based at least in part on the instruction being executed. The bits in the interrupt mask value correspond to various interrupts. For purposes of illustration, in the examples described herein, a bit value of 0 indicates that a particular interrupt is allowable and a bit value of 1 indicates that the interrupt is disallowed. Different notations may be used, including using 1 for an allowable interrupt and 0 for a disallowable interrupt.

Once the mask value is derived, a masking operation is performed (206). The masking operation involves the interrupt mask value and one or more pending interrupt indications. The pending interrupt indications show that one or more specific interrupts are pending. The pending interrupt indications may be implemented, for example, as one or more bits in a pending interrupt value register. In some embodiments, the masking operation checks the bit(s) in the interrupt mask value that correspond to the pending interrupt(s) to determine whether any pending interrupt is allowable. If a pending interrupt is deemed allowable, it is performed (208). If, however, no allowable interrupt is pending, the instruction performs its normal function (210).

In this example, performing an allowable interrupt (208) redirects the processor operations and prevents the instruction's normal function from being performed. In some embodiments, after an interrupt is performed, the instruction's normal function is still carried out. In some embodiments, the processor allows the instruction to fully perform its normal functions and checks for pending interrupts at the end of the instruction.

FIG. 3 is a block diagram illustrating an embodiment of data structures used for interrupt handling. The data structures shown in this example are applicable to both instruction types 106 and 108. Table 302 shows several different interrupt masks, A, B, C, and D. Additional interrupt masks are possible. Each bit value in a mask corresponds to a specific interrupt. Here, the bits correspond to interrupts u, v, w, x, y, and z. Different interrupt mask values represent different patterns of allowable interrupts. For example, mask value A is shown as 011001, which means that interrupts u, x, and y are allowable, and interrupts v, w and z are not. Table 304 maps each instruction to a corresponding interrupt mask value that defines which interrupts are handled by the instruction and which are not.

Figure 4:
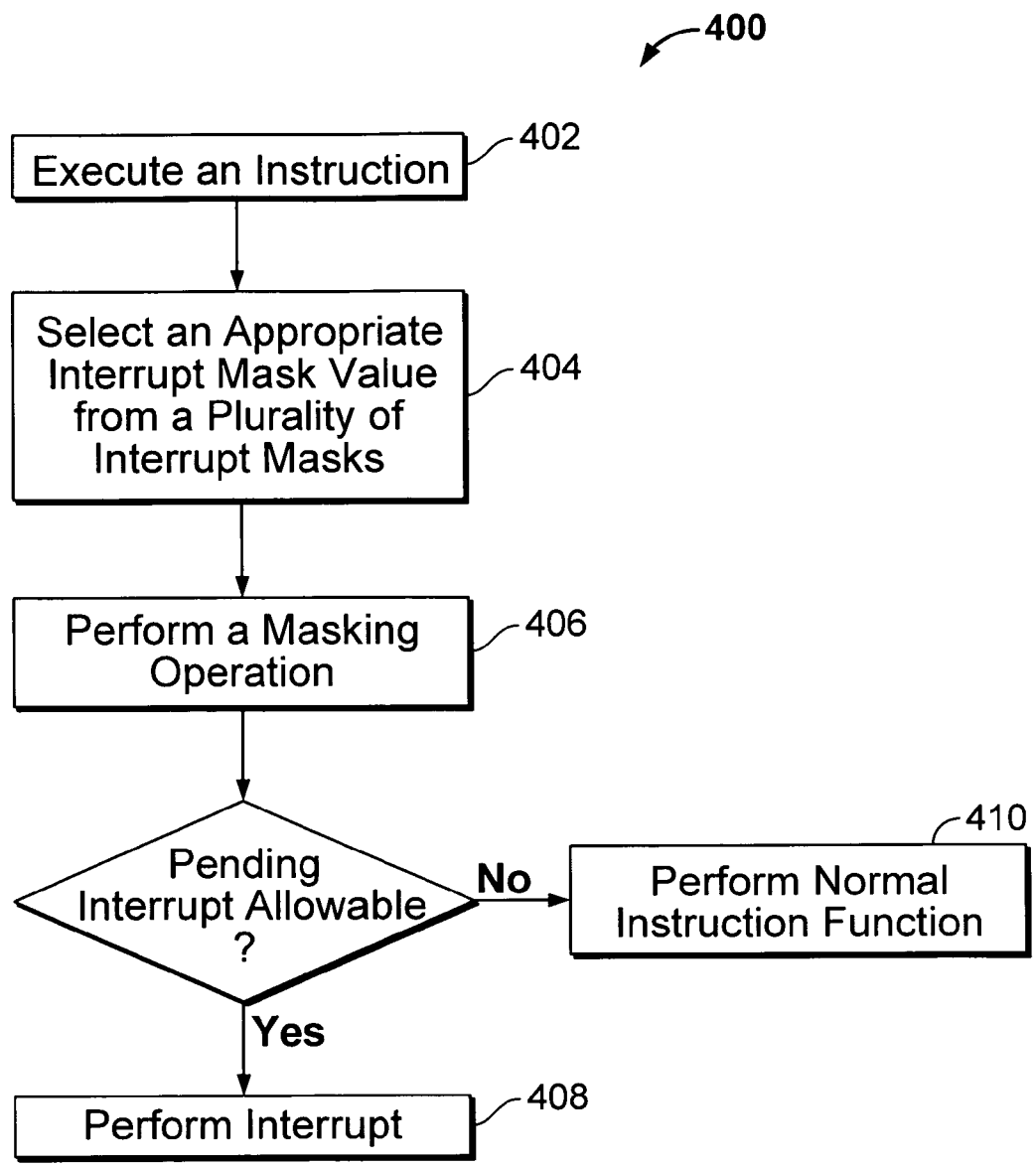
FIG. 4 is a flowchart illustrating an embodiment of a process of managing interrupts.

FIG. 4 is a flowchart illustrating an embodiment of a process of managing interrupts. In this example, the process uses the data structures shown in FIG. 3. Process 400 starts when an instruction is executed (402). Here, deriving the interrupt mask value includes selecting an appropriate interrupt mask value from a plurality of interrupt masks (404). In embodiments that employ a table for mapping interrupt mask values to instructions, the selection involves doing a table lookup. Other appropriate ways of making the selection may be performed for embodiments that employ other data structures. A masking operation of comparing the pending interrupts with the derived interrupt mask value is performed to determine whether any of the pending interrupts is allowable (406). If a pending interrupt is deemed allowable, it is performed (408). If, however, no allowable interrupt is pending, the instruction performs its normal function (410).

Returning to FIG. 3 for an example illustrating process 400. In this example, a branch instruction is executed and interrupts u, v, and x are pending. According to table 302, the interrupt mask corresponding to the branch instruction is D. D has a value of 010100, with the bits correspond to interrupts u, v, w, x, y, and z. Comparing the interrupts with the mask value, it is determined that pending interrupt u is allowable, but v and x are not. Thus, while pending interrupts v and x are ignored, pending interrupt u is allowed and an interrupt will be performed.

Although a table for mapping the interrupt masks to interrupts is used in the example shown in FIG. 3, other appropriate implementation may be used. In some embodiments, the interrupt mask value is derived according to an interrupt characteristic associated with the instruction. For example, some systems associate each instruction with an interrupt flag that indicates the appropriate interrupt mask value to use for this instruction. In a system with four different interrupt mask values, a two-bit interrupt flag may be used to indicate the correspondence of instruction to a specific interrupt mask value. For example, the flag may be set such that a flag of 00 corresponds to mask A, 01 corresponds to mask B, 10 corresponds to mask C, and 11 corresponds to mask D. While an instruction is executing, the interrupt mask value is determined by checking the associated interrupt flag.

In one example, the system uses two interrupt masks for safe point instructions and non-safe point instructions. The first interrupt mask value corresponds to the safe point instructions and includes a greater number of allowable interrupts than the second interrupt mask value, which corresponds to the non-safe point instructions. The selection of the interrupt mask value can be achieved using a one-bit interrupt flag. In this example, the safe point instructions are associated with an interrupt flag value of 0, indicating that that the instructions correspond to the first interrupt mask value. Other non-safe point instructions are associated with an interrupt flag value of 1, which corresponds to the second interrupt mask. While an instruction is executing, the interrupt mask value is determined by checking the associated interrupt flag value.

FIG. 5 is a block diagram illustrating another embodiment of data structures used for interrupt handling. In this example, a global mask 502 is used as a base mask value. Each instruction is associated with a secondary mask (e.g., 504, 506, etc.). During operation, the secondary mask is applied along with the global mask for deriving the appropriate interrupt mask value used for evaluating whether an interrupt is allowable. In various embodiments, the secondary masks may be fixed, preconfigured, or dynamically programmable. In various embodiments, the association of instructions with secondary masks may be fixed, or preconfigured, or dynamically programmable.

Figure 6:
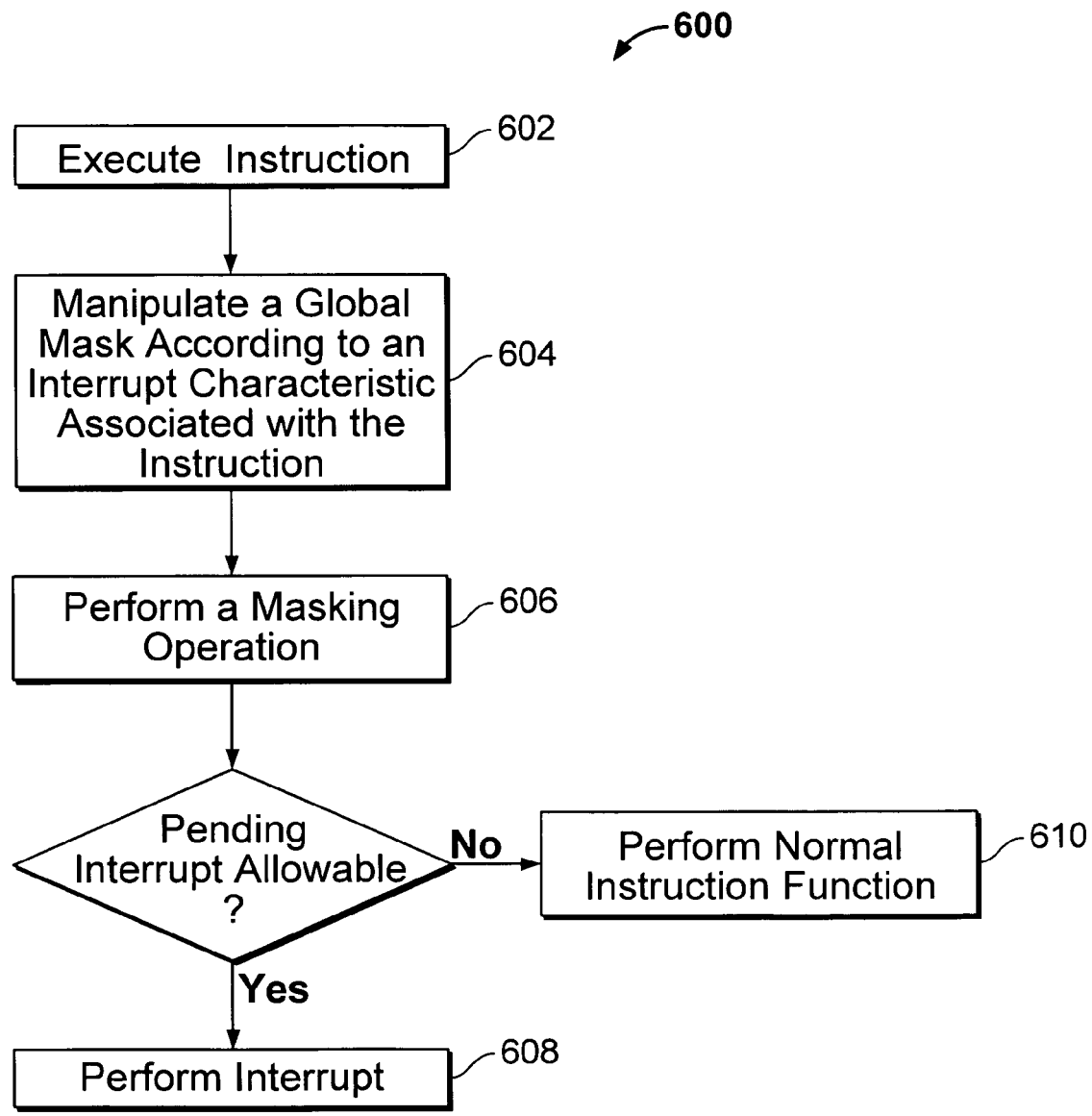
FIG. 6 is flowchart illustrating another embodiment of a process of managing interrupts.

FIG. 6 is flowchart illustrating another embodiment of a process of managing interrupts. In this example, process 600 uses the data structures shown in FIG. 5. The process starts when an instruction is executed (602). Deriving the interrupt mask value in this case includes manipulating a global mask according to an interrupt characteristic associated with the instruction (604). In some embodiments, the interrupt characteristic is the secondary mask associated with the instruction, and the manipulation of the global mask includes applying an OR operation to the global mask and the secondary mask. The resulting value from the OR operation is the interrupt mask value. Based on the interrupt mask value and the instruction, a masking operation is performed to determine whether any interrupt is allowable (606). If a pending interrupt is deemed allowable, it is performed (608). If, however, no allowable interrupt is pending, the instruction performs its normal function (610).

Returning to FIG. 5 for an example illustrating process 600. Assume that the pending interrupts are u and v. If the load instruction is executed, the OR operation on the global mask 100101 and the corresponding secondary mask 111111 results in an interrupt mask value of 111111. Thus, neither u nor v is allowed, and no interrupt will be performed. If the branch instruction is executed, the OR operation on the global mask and the corresponding secondary mask 000000 results in an interrupt mask value of 100101. Thus, while pending interrupt v is not allowed, pending interrupt u is allowed and an interrupt will be performed.

Some embodiments use other ways to manipulate the global mask to derive the interrupt mask value. For example, in some embodiments, there is a single secondary mask shared by all instructions. Each instruction has an interrupt characteristic, such as a flag, indicating whether to apply an OR operation to the global mask and the secondary mask, or to use the global mask directly.

Managing interrupts in a computing environment has been described. The techniques described above may be used individually in a system or combined with other techniques to more flexibly and more efficiently handle interrupts.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing interrupts in a computing environment, comprising:
executing an instruction, wherein the instruction comprises a native instruction included in a set of native instructions used to emulate a virtual instruction;
selecting, from a plurality of interrupt masks, an appropriate, corresponding interrupt mask for the native instruction being executed, wherein:
representations of at least a portion of the plurality of interrupt masks were previously stored in a table, and wherein the table specifies a mapping of each type of native instruction in the set of native instructions to a particular interrupt mask included in the plurality of interrupt masks;
a given interrupt mask in the plurality of interrupt masks is associated with a corresponding bit pattern representing a corresponding set of allowable and disallowable types of interrupts, wherein each bit in the bit pattern indicates whether a corresponding type of interrupt is allowable; and
selecting the appropriate, corresponding interrupt mask for the native instruction being executed includes performing a lookup of the table based at least in part on the type of the native instruction being executed;
subsequent to selecting the appropriate, corresponding interrupt mask, determining, based at least in part on a masking operation involving the selected interrupt mask, whether each pending type of interrupt in a set of one or more pending types of interrupts is allowable at least in part by checking a corresponding bit in the bit pattern associated with the selected interrupt mask; and
in the event that a pending type of interrupt is determined to be allowable, performing the pending type of interrupt.

2. A method as recited in claim 1, further comprising, in the event that no pending type of interrupt is determined to be allowable, performing the normal function of the native instruction.

3. A method as recited in claim 1, wherein in the event that the pending type of interrupt is performed, the normal function of the native instruction is not performed.

4. A method as recited in claim 1, wherein the native instruction being executed comprises a branch instruction.

5. A method as recited in claim 1, wherein the native instruction being executed comprises a safe point instruction.

6. A method as recited in claim 1, wherein the computing environment is a virtual machine environment.

7. A system for handling interrupts, comprising:
a processor configured to:
execute an instruction, wherein the instruction comprises a native instruction included in a set of native instructions used to emulate a virtual instruction;
select, from a plurality of interrupt masks, an appropriate, corresponding interrupt mask for the native instruction being executed, wherein:
representations of at least a portion of the plurality of interrupt masks were previously stored in a table, and wherein the table specifies a mapping of each type of native instruction in the set of native instructions to a particular interrupt mask included in the plurality of interrupt masks;
a given interrupt mask in the plurality of interrupt masks is associated with a corresponding bit pattern representing a corresponding set of allowable and disallowable types of interrupts, wherein each bit in the bit pattern indicates whether a corresponding type of interrupt is allowable; and
selecting the appropriate, corresponding interrupt mask for the native instruction being executed includes performing a lookup of the table based at least in part on the type of the native instruction being executed;
subsequent to selecting the appropriate, corresponding interrupt mask, determine, based at least on a masking operation involving the selected interrupt mask, whether each pending type of interrupt in a set of one or more pending types of interrupts is allowable at least in part by checking a corresponding bit in the bit pattern associated with the selected interrupt mask; and
in the event that a pending type of interrupt is determined to be allowable, perform the pending type of interrupt.

8. A system as recited in claim 7, wherein the processor is further configured to perform the normal function of the native instruction in the event that no pending type of interrupt is determined to be allowable.

9. A system as recited in claim 7, wherein the processor is further configured not to perform the normal function of the native instruction in the event that the pending type of interrupt is performed.

10. A system as recited in claim 7, wherein the native instruction being executed comprises a branch instruction.

11. A system as recited in claim 7, wherein the native instruction being executed comprises a safe point instruction.

12. A processor comprising:
a logical unit configured to:
execute an instruction, wherein the instruction comprises a native instruction included in a set of native instructions used to emulate a virtual instruction;

select, from a plurality of interrupt masks, an appropriate, corresponding interrupt mask for the native instruction being executed, wherein:
representations of at least a portion of the plurality of interrupt masks were previously stored in a table, and wherein the table specifies a mapping of each type of native instruction in the set of native instructions to a particular interrupt mask included in the plurality of interrupt masks;
a given interrupt mask in the plurality of interrupt masks is associated with a corresponding bit pattern representing a corresponding set of allowable and disallowable types of interrupts, wherein each bit in the bit pattern indicates whether a corresponding type of interrupt is allowable; and
selecting the appropriate, corresponding interrupt mask for the native instruction being executed includes performing a lookup of the table based at least in part on the type of the native instruction being executed;
subsequent to selecting the appropriate, corresponding interrupt mask, determine, based at least in part on a masking operation involving the selected interrupt mask, whether each pending type of interrupt in a set of one or more pending types of interrupts is allowable at least in part by checking a corresponding bit in the bit pattern associated with the selected interrupt mask; and
in the event that a pending type of interrupt is determined to be allowable, perform the pending type of interrupt.

13. A processor as recited in claim 12, wherein the logical unit is further configured to perform the normal function of the native instruction in the event that no pending type of interrupt is determined to be allowable.

14. A processor as recited in claim 12, wherein the logical unit is further configured not to perform the normal function of the native instruction in the event that the pending type of interrupt is performed.

15. A processor as recited in claim 12, wherein the native instruction being executed comprises a branch instruction.

16. A processor as recited in claim 12, wherein the native instruction being executed comprises a safe point instruction.

* * * * *